C. L. BEST.
TRACTOR CHAIN.
APPLICATION FILED MAR. 6, 1913.

1,159,163.

Patented Nov. 2, 1915.
2 SHEETS—SHEET 1.

Inventor
Clarence Leo Best

Witnesses

By Harry C. Schroeder
Attorney

C. L. BEST.
TRACTOR CHAIN.
APPLICATION FILED MAR. 6, 1913.
1,159,163.
Patented Nov. 2, 1915.
2 SHEETS—SHEET 2.
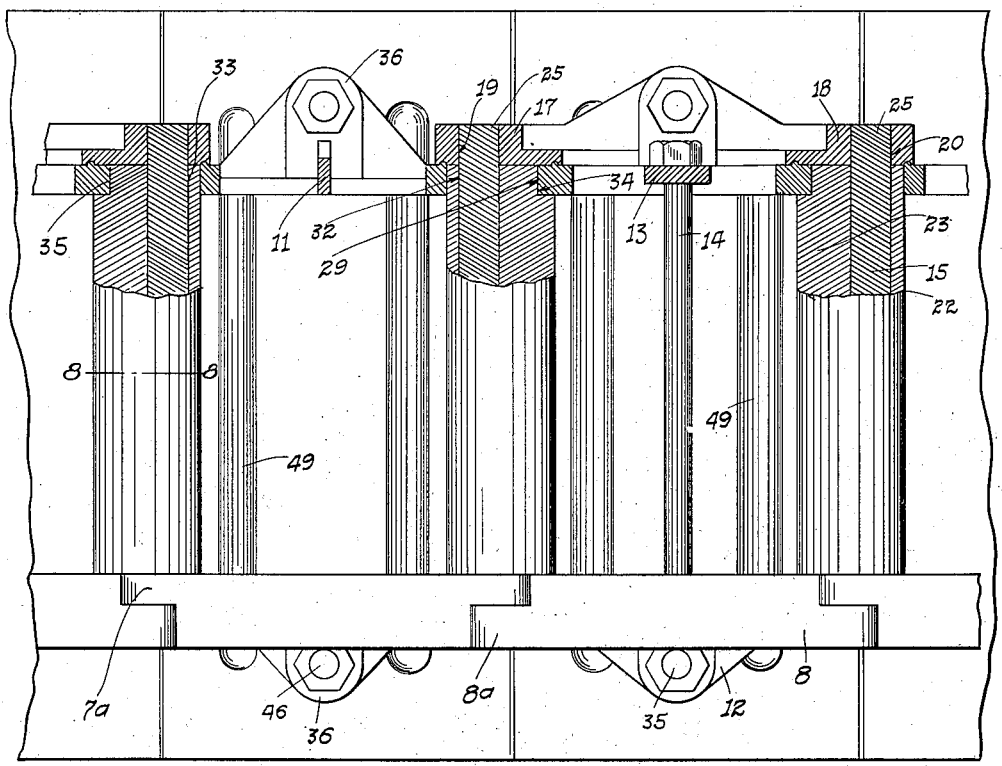
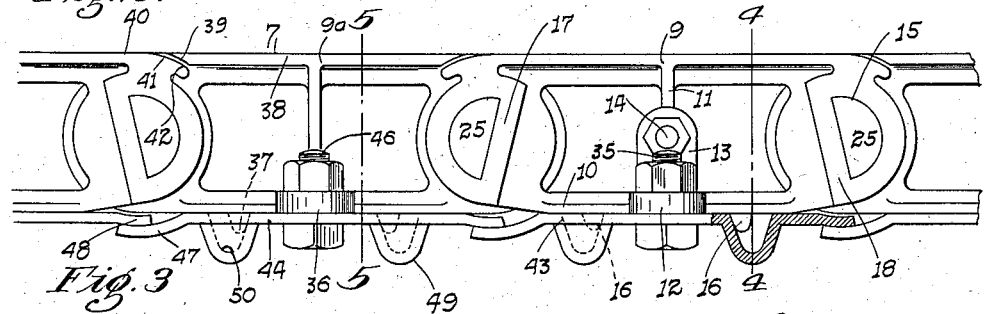
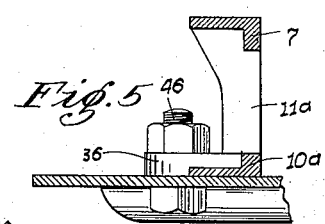
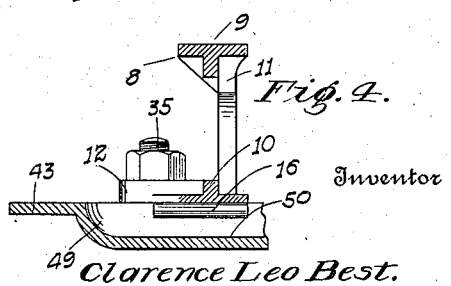
Inventor
Clarence Leo Best.
Witnesses
By
Attorney

UNITED STATES PATENT OFFICE.

CLARENCE LEO BEST, OF ELMHURST, CALIFORNIA.

TRACTOR-CHAIN.

1,159,163.  Specification of Letters Patent.  Patented Nov. 2, 1915.

Application filed March 6, 1913. Serial No. 752,397.

*To all whom it may concern:*

Be it known that I, CLARENCE LEO BEST, a citizen of the United States, residing at Elmhurst, in the county of Alameda and State of California, have invented certain new and useful Improvements in Tractor-Chains, of which the following is a specification.

My invention relates to tractor chains and has as its principal object to provide a tractor chain for self-propelling tractor engines which shall be more efficient in action than those now in use.

A further object of the present invention is to provide simple, cheap, and effective devices to meet the requirements of track-laying tractors and the adverse conditions to which such chains are subjected in farm and agricultural service.

A still further object of the invention is to provide an improved track laying tractor chain in which excessive wear and tear on the hinge pins of the chain is greatly diminished, the need of lubrication avoided and the flexibility of the chain increased.

Figure 1:
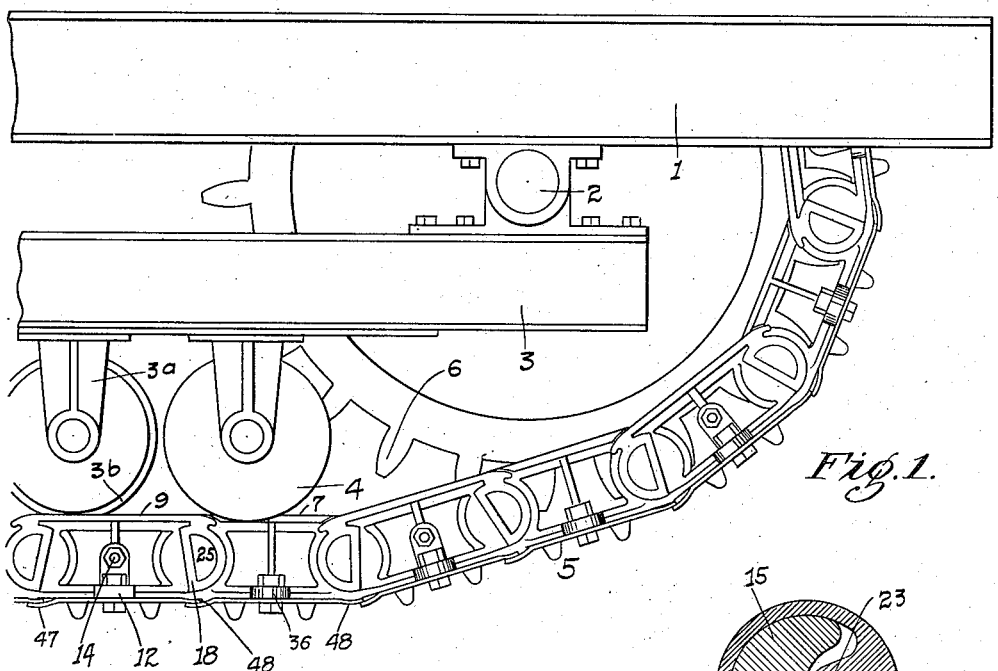
Figure 8:
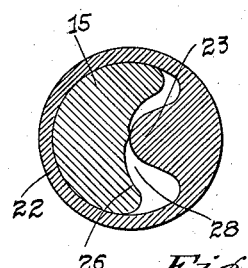
Figure 6:
Figure 7:
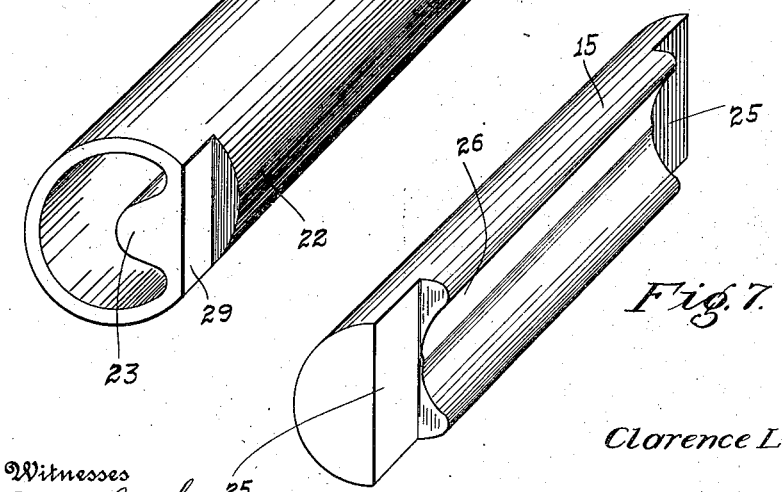

These desirable objects have been accomplished in the present invention by means of the hereinafter described devices and mechanisms—reference being had to the accompanying drawings in which:

Figure 1 is an elevational view of a part of a traction engine equipped with my improved chain. Fig. 2 is a top plan view of a portion of the chain shown in Fig. 1, parts being broken away. Fig. 3 is an elevational view taken at right angles to Fig. 2, parts being broken away. Fig. 4 is a detail view in cross section taken on line 4—4 of Fig. 3, only a portion of the section being shown. Fig. 5 is a cross sectional view similar to Fig. 4, taken on line 5—5 of Fig. 3. Fig. 6 is a detail perspective view showing one of the bearing sleeves used in my chain. Fig. 7 is a detail perspective view showing one of the bearing pins used in my chain in conjunction with the sleeve shown in Fig. 6. Fig. 8 is a detail sectional view taken on the line 8—8 of Fig. 2 and showing the pin of Fig. 7 assembled within the sleeve of Fig. 6.

Referring to a detail description of the drawing, wherein like reference characters designate corresponding parts throughout the several views, 1 designates the main frame of a traction engine to which is pivotally connected at one end a tractor frame 3 by means of a pivot shaft 2 that is mounted in suitable brackets on the frames 1 and 3 respectively. At one end of the tractor frame is a power driven sprocket wheel 6, said sprocket wheel being suitably mounted on the main frame and having its axis of rotation concentric with the pivotal axis of the tractor frame. The sprocket wheel is conveniently mounted on the pivot shaft 2. Power means (not shown) of any approved type is mounted on the main frame 1 and operatively connected in any suitable manner with the driving sprocket wheel 6.

Extending around the driving sprocket wheel 6 is an endless traction chain 5, and it will be understood that said chain is also trained over a similar sprocket wheel (not shown) located at the other end of the tractor frame 3 in accordance with the usual practice.

Between the sprocket wheels is arranged an anti-friction chain guide and support, the same being shown in the present instance as comprising wheels or rolls 4 mounted in suitable brackets $3^a$ attached to the under side of frame 3. The rolls or wheels 4 are adapted to engage the inner faces of the links of the chain 5, and said rolls or wheels are provided with flanges as shown at $3^b$, said flanges being on the outside of the wheels with respect to the chain, and the wheels being offset one from the other, so that the flange of one wheel runs on the outer edge of the chain at one side and the flange of the next succeeding wheel runs on the outer edge of the chain on the opposite side from the flange of the first mentioned wheel.

The chain 5 heretofore referred to is shown as comprising side plates or links 7 and 8 connected by bolts 14 and also by tread plates 43 and 44.

To meet and provide for the peculiarly exacting conditions, not elsewhere met with, in tractor chains in agricultural tractor service, a radical departure in chain construction is introduced in the means employed for hinging the links, (made as already described) to each other. Between the side plates 7 and 8 is provided at one end a sleeve 22 rigidly secured at each of its ends to the side plates by any suitable means. Interiorly of the sleeve 22 is provided a longitudinally extending radially arranged rib 25 extending to the axis of the sleeve and being rounded in cross section as shown. Between the side plates 7 and 8 at the opposite end from sleeve 22 is provided a strut 15 of less diameter than the interior diameter of the sleeve. The strut is adapted to work within the sleeve 22 and has a working surface 26 extending longitudinally of the strut along its axis adapted to cooperate with the rib 23 to afford a rolling contact between the parts at the axial center of hinge motion of the links. The strut is rigidly secured at each of its ends to the side plates or links 7—8 with its working surface set at an angle with the longitudinally horizontal plane of the hinge axes of the said plates.

Referring more particularly to Fig. 2, it will be understood that the complete chain 5 is made up of two sets of plates or links 7 and 8 which are arranged in pairs, one plate of each pair being set on each side of the chain. In Fig. 2 the links 7 and 8 are partly broken away on one side but it will be understood that these links are identical on both sides of the chain. It will be seen, moreover, that the links 7 and 8 are each provided with offset overlapping portions extending longitudinally of the chain at each end as shown at 7ª and 8ª, but that the overlapping portions of the links 8 are disposed on the outside of the chain while the portions 7ª overlap the portions 8ª but on the inside of the chain.

Each plate or link such as 7 or 8 comprises two parallel bars such as 9 and 10, respectively, the bars 9 being at the top or inside of the chain as shown in Fig. 3 and serve as tracks for the wheels 4. Midway between the ends of the links the bars 9 and 10 are connected by posts or webs such as are shown at 11ª in Fig. 5 and 11 in Fig. 4. It will be observed that the post 11 is flattened longitudinally of the links and by referring to Fig. 2 it will be seen that the posts 11 thereby serve to engage nuts at the outer ends of cross bar 14 which serve to hold together the links 8 which are disposed in pairs on opposite sides of the chain. Because of the engagement between the lugs 7ª and 8ª previously mentioned and on account of the relative position of these lugs the links 7 do not need to be connected in the way just described for the links 8 and consequently the posts 11ª are made with their greatest dimension crosswise of the links.

It will be seen by referring to Fig. 3 that the flattened portion of the posts 11 is in the form of a lug designated as 13. The links 7 and 8 are also provided with horizontally extending lugs 36 and 12, respectively, appearing in Figs. 4 and 5, which lugs serve to attach bearing plates 43 and 44 to the lower web 10 of the links 7 and 8. Links 7 and 8 are also provided with projecting lugs 37 and 16, respectively, which project down from the lower web 10 within the hollow rib 49 so as to transmit the motion of the chain to the bearing plates 43 and 44. It will be observed that lugs 16 are so disposed with reference to the ribs 49 that they bear against the inner faces of the ribs on the side nearest the center of the links so that the plates are fixed relatively to the links. As appears from Fig. 1 the links 7 and 8 must turn relatively to each other in order to pass around the sprocket wheel 6. As illustrated in the drawings the links 7 at each end are preferably provided with partly round apertures therein designated as 32 and 33, and the sleeves 22, shown in Fig. 6, are designed to be held in these apertures and in order to prevent the rotation of the sleeves relatively to the links 7, the sleeves are provided with flattened faces 29 which abut against flattened portions 35 and 34 on the inside of the apertures 33 and 32. The struts 15 illustrated in Fig. 7 are longer than the sleeves 22 so that the half round ends 25 project beyond the sleeves 22 and fit within similarly formed apertures 19 and 20 which are formed at the ends of each link 8 within the hubs 17 and 18, respectively. The ends of the track portions 9ª of the links 7 are undercut as shown at 39 while the ends of the links 8 are rounded downwardly as shown at 41, so as to slip beneath the chamfered ends 39, as clearly shown in Figs. 1 and 3.

Shoes 43 and 44 previously mentioned are attached to the lugs 12 and 36 by means of bolts 35 and 46, respectively. These shoes preferably extend laterally on opposite sides of the chain for a considerable distance and the width of each shoe is practically equal to the distance between the centers of the pins 15. These shoes overlap consequently and the margin 47 of shoe 44 is preferably slightly curved on an arc of which the axis of pin 15 is the center and such margin is disposed in underlapping relation with a correspondingly curved margin 48 of shoe 43. By means of this overlapping feature the tread surface is made continuous and the curved margins permit of the necessary extension and contraction when the chain takes the curve of the sprocket wheel. The hollow ribs carried on the shoes 43 and 44 which have been previously mentioned, are primarily for the purpose of increasing the tractive effect of the chain but also serve to position the plates with reference to the links of the chain as previously mentioned and thus relieve the bolts 35 and 46 of excessive strain.

The chain construction hereinbefore set forth meets the conditions of track laying tractors and provides for the objects hereinbefore set forth in a practical and serviceable manner.

In view of the radical departure in the present invention from the normal practice and the important results secured thereby, I do not desire to confine myself to the particular form, arrangement or details of construction herein set forth, and I claim this invention broadly and all modifications thereof, such as may be made to adapt the invention to particular uses or conditions of operation without departing from the spirit of the invention.

What I claim is:

1. An endless track for traction engines comprising tread plates, link members rigid with the tread plates, means for hinging adjacent link members together comprising a pair of members having portions in rolling contact at the axial center of hinged motion of the links, and means for resisting torsional distortion of the said link members relative to each other.

2. In an endless track for traction engines, the combination with tread plates, of means for pivotally connecting the tread plates together comprising spaced tracks rigidly secured in their spaced relation and to the tread plates, and a pivotal connection between adjacent ends of the track members comprising a pair of members having portions in rolling contact at the axial center of hinged motion of the links.

3. An endless track for traction engines comprising a series of tread plates, means for pivotally connecting the tread plates consisting of a line contact rocking bearing, and means rigid with the tread plates for supporting the bearing members and for maintaining the same in their proper relative positions.

4. An endless track and tread for traction engines, comprising tread plates, parallel track members hinged together in rolling contact at their axial center of hinged motion, and means for securing the tread plates to the track members to resist longitudinal bending of the tread plates and whereby the tread plates serve to support the track members against transverse distortion relative to each other and maintain the rocking members in operative relation.

5. An endless track for traction engines comprising overlapping tread plates, link members rigid with the tread plates, means for hinging adjacent link members together comprising a pair of members having portions in rolling contact at the axial center of hinged motion of the links, and means for resisting torsional distortion of the said link members relative to each other.

6. A tractor chain comprising in combination a plurality of pivoted links provided with projecting lugs on one face thereof, bearing shoes attached to said links on the same side as the said lugs and having hollow ribs extending transversely thereof, and means for attaching said shoes to said links, the lugs fitting within the hollow ribs but being placed a less distance apart than the ribs whereby they contact with the faces of the ribs which are near the center of their respective shoes.

In testimony whereof I affix my signature in presence of two witnesses.

CLARENCE LEO BEST.

Witnesses:
 FRANK H. CARTER,
 F. P. SCHROEDER.